United States Patent [19]
Hauser et al.

[11] Patent Number: 5,734,700
[45] Date of Patent: Mar. 31, 1998

[54] SYSTEM FOR CALL FORWARDING FROM A FIRST COMMUNICATION NETWORK TO A SECOND REMOTE COMMUNICATION NETWORK AND A SYSTEM FOR VIRTUAL EXTENSION OF A MOBILE COMMUNICATION NETWORK BY AT LEAST A SECOND REMOTE COMMUNICATION NETWORK

[75] Inventors: Hans Hauser, Wachtberg; Patrik Ljungström, Bonn, both of Germany

[73] Assignee: DeTe Mobil (Deutsche Telekom Mobilfunk GmbH), Bonn, Germany

[21] Appl. No.: 509,084

[22] Filed: Jul. 31, 1995

[30] Foreign Application Priority Data

Aug. 1, 1994 [DE] Germany ............... 44 27 072.0

[51] Int. Cl.⁶ ............... H04Q 7/20; H04Q 7/22
[52] U.S. Cl. ............... 379/59; 379/58; 379/59; 379/60; 455/33.1; 455/33.2
[58] Field of Search ............... 379/58, 59, 60, 379/62, 63; 455/33.1, 33.2

[56] References Cited

U.S. PATENT DOCUMENTS 5,537,610 7/1996 Mauger et al. ............... 379/58

FOREIGN PATENT DOCUMENTS 2234649 6/1991 United Kingdom.

Primary Examiner—Dwayne Bost
Assistant Examiner—Nay Maung
Attorney, Agent, or Firm—Lackenbach Siegel Marzullo Aronson & Greenspan, P.C.

[57] ABSTRACT

One embodiment of the invention is related to a system for virtual extension of a mobile communication network by at least a second, remote mobile communication network, wherein one of communication network is of the GSM (Global System for Mobile Communications) type, including a bridgehead between the first and second mobile communication network, said bridgehead serving as an internetwork junction to one of said mobile communication networks of the GSM type (transition network). The bridgehead acts as a Visitor Location Register (VLR) for another mobile communication network and as a Home Location Register (HLR) for the transition network, if a subscriber of the other mobile communication network is in the range of the mobile communication networks of the GSM type and acts as an HLR for the other mobile communication network and as a VLR for the transition network, if a subscriber of the mobile communication networks of the GSM type is in the range of the other mobile communication network.

10 Claims, 8 Drawing Sheets

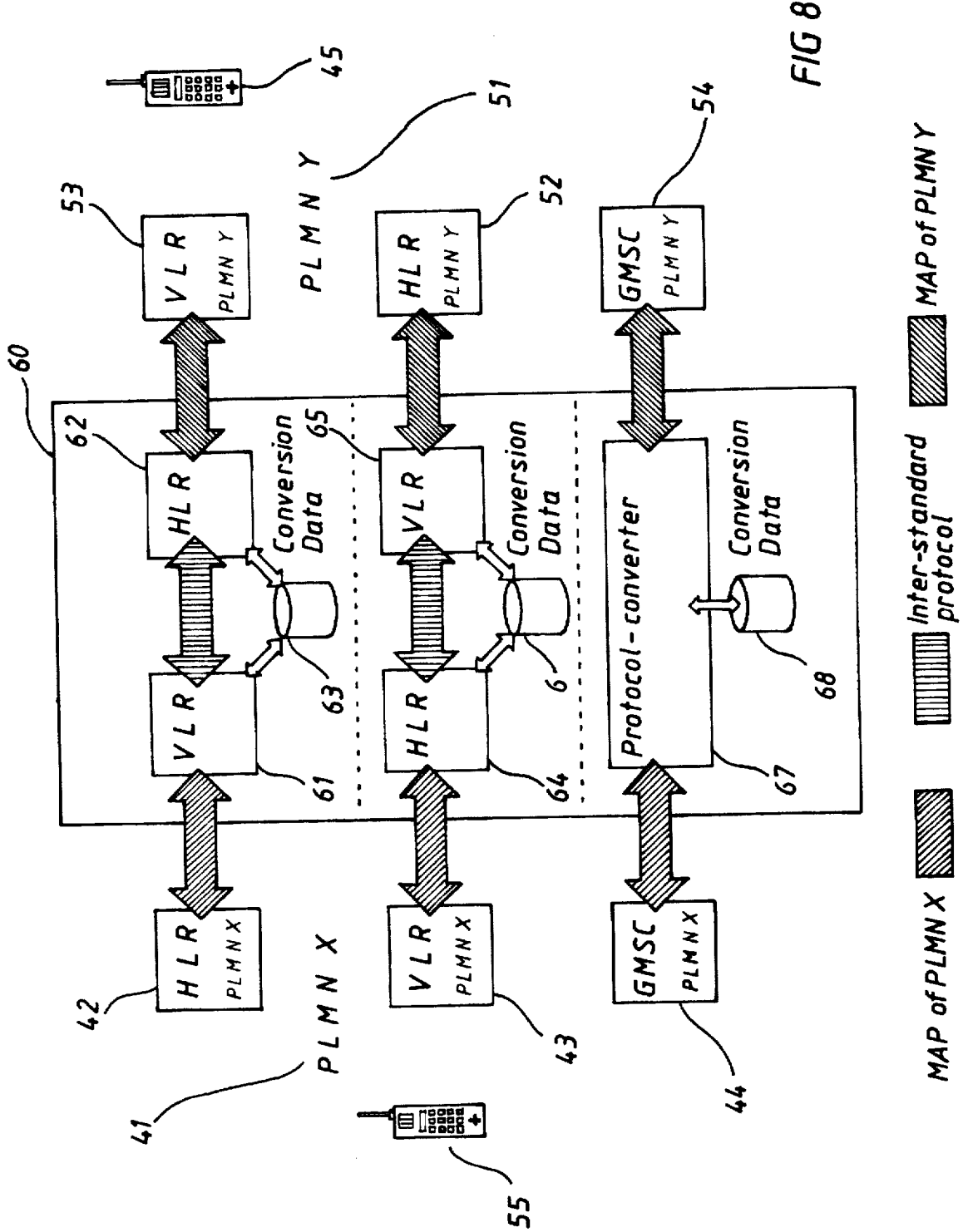

SYSTEM FOR CALL FORWARDING FROM A FIRST COMMUNICATION NETWORK TO A SECOND REMOTE COMMUNICATION NETWORK AND A SYSTEM FOR VIRTUAL EXTENSION OF A MOBILE COMMUNICATION NETWORK BY AT LEAST A SECOND REMOTE COMMUNICATION NETWORK

FIELD OF THE INVENTION

The invention relates to a system for call forwarding from a first communication network to a second remote communication network, whereby the second communication network is one of several mobile communication networks of the GSM type (Global System for Mobile Communications).

The invention relates as well to a system for virtual extension of a mobile communication network by at least a second, remote mobile communication network, whereby the second communication network is one of several mobile communication networks of the GSM type (Global System for Mobile Communications).

BACKGROUND OF INVENTION

Digital mobile communication networks of the GSM type, standardized by the European Telecommunications Standards Institute (ETSI), have been or will be installed in almost all European countries and also in a rising number of East European, Asian and African countries and in Australia.

An important characteristic of the GSM standard is that in a GSM mobile communication network a subscriber has the possibility to use the services of another GSM network as a temporary subscriber (International Roaming). However this requires an agreement between the operators of the related mobile communication networks. Generally it is not possible for subscribers of non-GSM standard mobile communication networks to use services of GSM mobile communication networks or services of other mobile communication networks.

SUMMARY OF THE INVENTION

It is the object of the invention to provide the possibility to virtually extend mobile communication networks not working under the GSM standard by using GSM mobile communication networks.

The problem is according to a first main embodiment solved by providing a bridgehead in the first communication network which serves as an internetwork junction between a first communication network and one of the GSM networks (transition network), whereby calling numbers of the first communication network are assigned to the bridgehead to which further calling numbers of the first communication network are assignable by call forwarding. In the bridgehead also occurs a conversion into GSM calling numbers, which bridgehead is connected to a Mobile Services Switching Center (MSC) of the transition network via signaling channels and intelligence signal channels and also incorporates the basic services for subscribers of a GSM mobile communication network.

The system according to the invention not only enables subscribers of other mobile communication networks to use a GSM mobile communication network but also enables them to use all GSM mobile communication networks without further requirements under condition that the operators have made a so called roaming agreement.

In a preferred embodiment of the invention it is possible by booking a service according to the invention that by providing call forwarding in the first communication network a GSM calling number is assigned to the calling number which can be reached by the call forwarding in the bridgehead. The corresponding GSM calling number is routed to and saved in a subscriber register (Home Location Register, HLR) of the transition network.

An important commercial application of the system according to the invention is seen in the communication between the USA and Europe or other GSM countries.

For this purpose a bridgehead has to be installed in the USA which is connected via a direct line to a Gateway Mobile Services Switching Center (GMSC) in Europe, which is for example part of the German D1 mobile communication network. A traveler from the USA commissions the US mobile communication operator to assign his calling number to a number of the bridgehead by call forwarding during his absence. So he will be within calling access under his usual calling number during his trip to Europe.

Before his trip or before he set out the trip he will get a Mobile Subscriber calling number (MSISDN) which is a number of the European GSM network which will be enabled latest on his arrival in Europe. He also will get a mobile phone. The traveler may now be reached under his usual calling number without having to present his temporary domicile.

The system according to the invention has also the advantage that multiple services of the GSM network can be used without requiring further steps. During connection buildup it is just necessary to exchange signaling information via the data connection.

In a further embodiment of the invention the bridgehead is prepared to handle the Message Authentication Protocol (MAP) under the GSM standard. The bridgehead in the transition network operates therefor as a Gateway Mobile Services Switching Center (GMSC).

It is of particular advantage when the first communication network is also a mobile communication network.

In still a further embodiment of the invention it is intended that the bridgehead comprises means for storing and restoring voice signals (Voice Mail System) in the area of the first communication network. Voice signals from the first and the second communication system can be stored/restored in such a Voice Mail System.

This improves the communication between a subscriber of the first communication network and a temporary subscriber of the GSM network e.g. because of the time shift between the continents.

In still a further embodiment the bridgehead in the first communication network comprises a speech memory with announcement messages stored therein. This may help a subscriber to get important information about the call transfer in case he was not well informed before. The announcements may for example inform the subscriber that his call is transferred to another continent. The subscriber may then decide to continue or to stop his call depending on the importance of the call.

In the above described embodiment the stored announcements may be recalled during calls from the first communication network dependent of signals from the second communication network. That way the subscriber will get additional information e.g. information about the time shift between the place of calling and the place of the temporary GSM subscriber. The place of the temporary GSM subscriber is stored in the GSM network as soon as the temporary GSM subscriber has logged in one of the GSM mobile communication networks.

This first main embodiment according to claim 1 discloses a system for call forwarding from a first communication network to a second remote communication network by means of a bridgehead, wherein the calling numbers of the first communication network are assigned to the bridgehead.

The second main embodiment of the invention according to claim 11 provides an extension of mobile communication networks not working according to GSM with networks of the GSM type and vice versa.

Accordingly there is provided a bridgehead capable of conducting a Mobile Management Protocol, the Mobile Application Part.

Claims 13–17 disclose means for storing and recalling voice signals and/or announcements as already described in connection with the first main embodiment.

BRIEF DESCRIPTION OF THE DRAWINGS

The invention will now be further described by way of the accompanying drawings.

FIG. 8: a bridgehead with signalling and operating traffic between two selected mobile communication networks PLMN X and PLMN Y.

In the drawings same references indicate the same parts. The references 1 to 9 in drawing FIGS. 2 to 5 are used to indicate a sequence of different activities wherein the same numbers do not always indicate the same activity.

DESCRIPTION OF THE PREFERRED EMBODIMENTS

Figure 1:
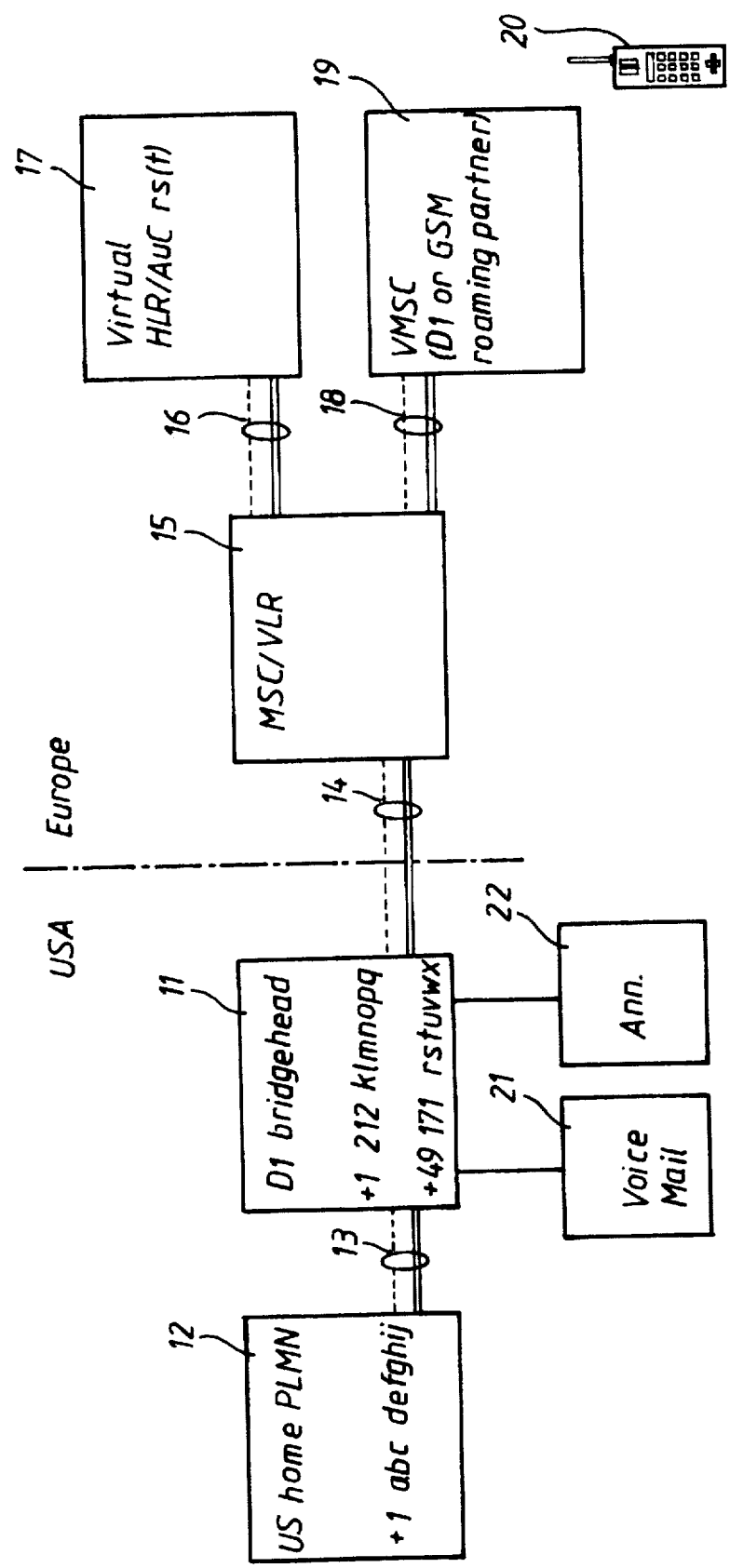
FIG. 1: shows a schematic representation of the system according to the first main embodiment and the communication networks connected therewith.

FIG. 1 shows a bridgehead 11 situated in the USA which is connected with a mobile communication network 12 in the USA via lines 13 comprising signaling channels, indicated by dotted lines, and intelligence signal channels, indicated by solid lines. The bridgehead 11 is connected to a Mobile Services Switching Center (MSC) 15 in Europe, for example in Frankfurt/M., Germany, via a transatlantic connection 14 which also comprises signaling and intelligence signal channels. The MSC comprises also a Visitor Location Register (VLR).

The Mobile Services Switching Center (MSC) 15 has access to a Virtual Home Location Register (VHLR) 17 which serves also as an authentication center. The MSC 15 is further connected to a MSC 19 in which the temporary GSM subscriber 20 is allocated at the moment, via lines 18. This Mobile Services Switching Center is therefore also called Visitors Mobile Services Switching Center VMSC. The VMSC 19 may be part of the same mobile communication network as the MSC 15—herein described as D1 network—or may be part of another GSM mobile communication network which cooperates with said network on basis of a roaming agreement.

A Voice Mail System 21 and a speech memory for announcements 22 are connected to the bridgehead 11. Within the mobile communication network 12 the calling numbers have the structure shown in FIG. 1. A call for the calling number "+1 abc defghij" reaches a connection of the bridgehead with the number "+1 212 klmnopq". This number is converted to a calling number of the D1 network in the form "+49 171 rstuvwx".

Figure 2:
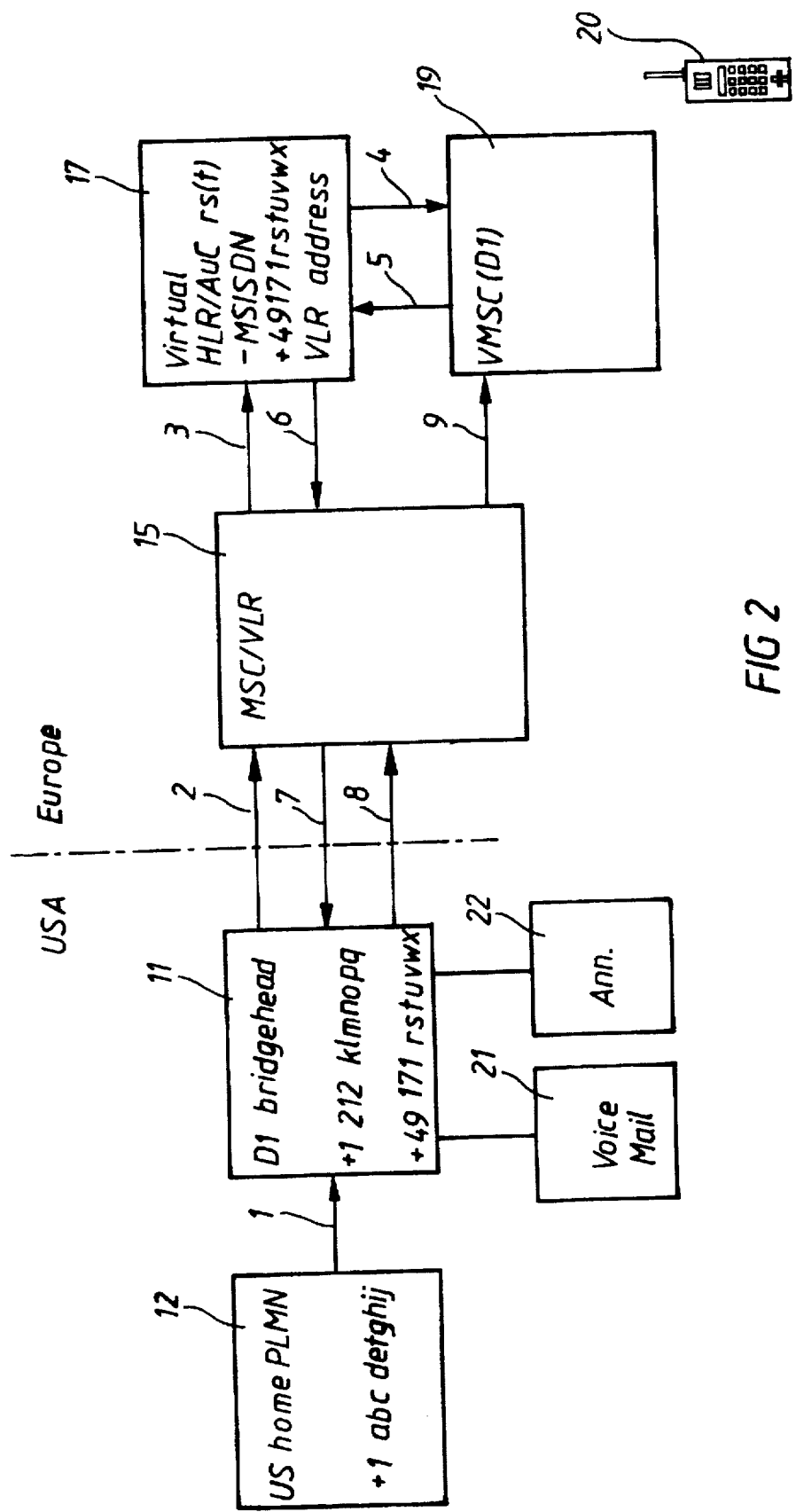
FIG. 2: shows the same system schematically representing the connection buildup for call transferring between a US mobile communication network and the German D1 mobile communication network.

In FIG. 2 an arrow 1 indicates the call forwarding from the mobile communication network 12 in the USA to the bridgehead 11. The bridgehead then sends an interrogation 2 to the MSC 15 which transfers the interrogation 2 in form of an interrogation 3 to the Virtual Home Location Register 17 in which the MSISDN number "+49 171 rstuvwx" of the temporary GSM subscriber is stored. The Virtual HLR 17 further includes the address of the Visitor Location Register VLR of the VMSC 19. As indicated by 4 the so called roaming number is questioned from the VMSC 19 which is then transferred into the Virtual Home Location Register as indicated by 5. The roaming number is then transferred to the Mobile Services Switching Center 15 as indicated by 6 and then transferred to the bridgehead 11 as indicated by 7. The bridgehead 11 causes the routing of the connection to the Mobile Services Switching center 15 as indicated by 8 and also to the VMSC 19 as indicated by 9 and finally to the temporary GSM subscriber 20.

Figure 3:
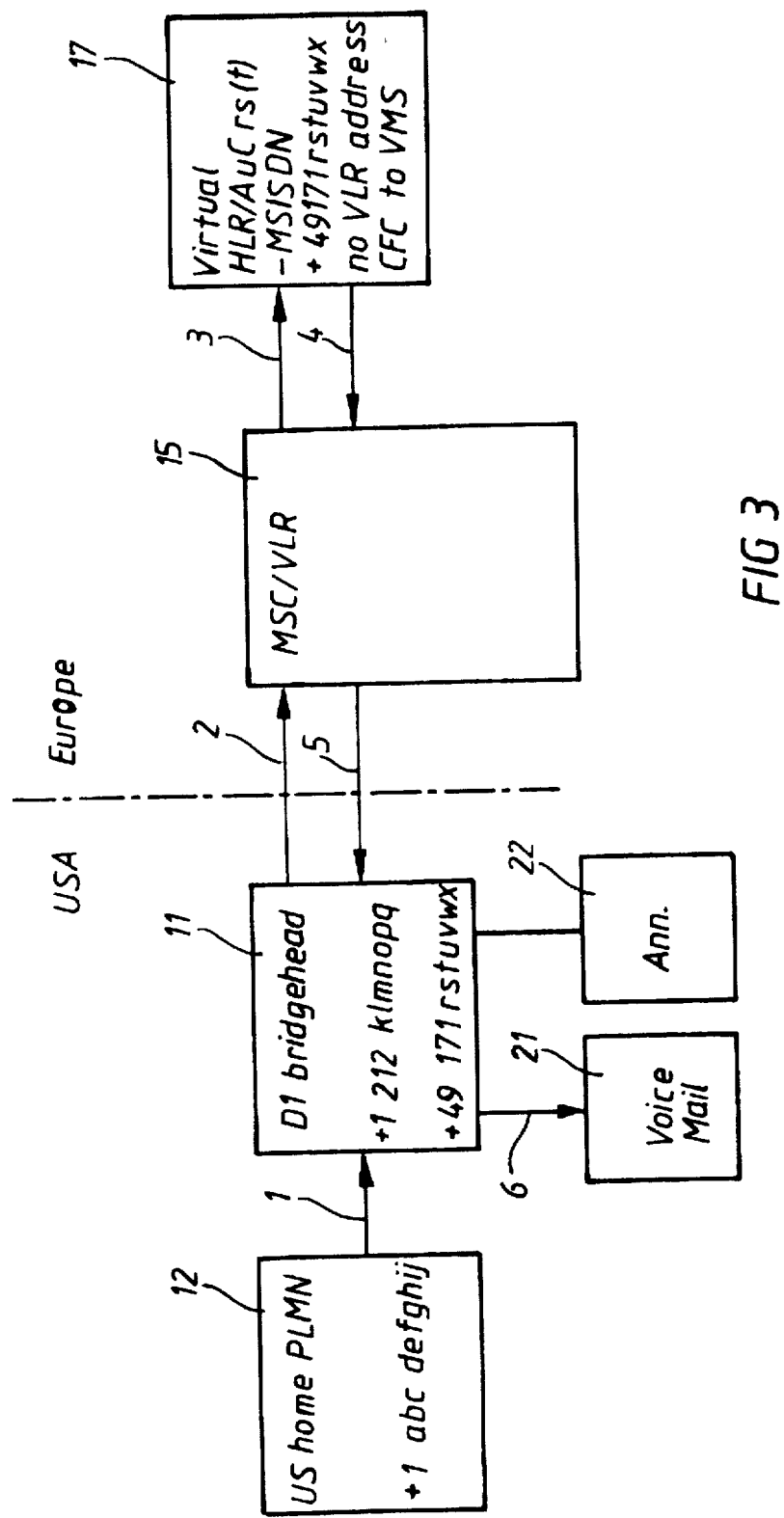
FIG. 3: shows a call transfer to a Voice Mail System.

FIG. 3 shows the case where the same interrogation is used as described in connection with FIG. 2. However, the virtual Home Location Register 17 does not contain a address of a Visitor Location Register but contains a instruction for a Conditional Call Forwarding CFC to the Voice Mail System 21. This instruction is transferred to the MSC 15 and also to the bridgehead as indicated by 4 and 5, respectively. Therein the call is transferred to the Voice Mail System where the Voice signals can be recorded and played back.

Figure 4:
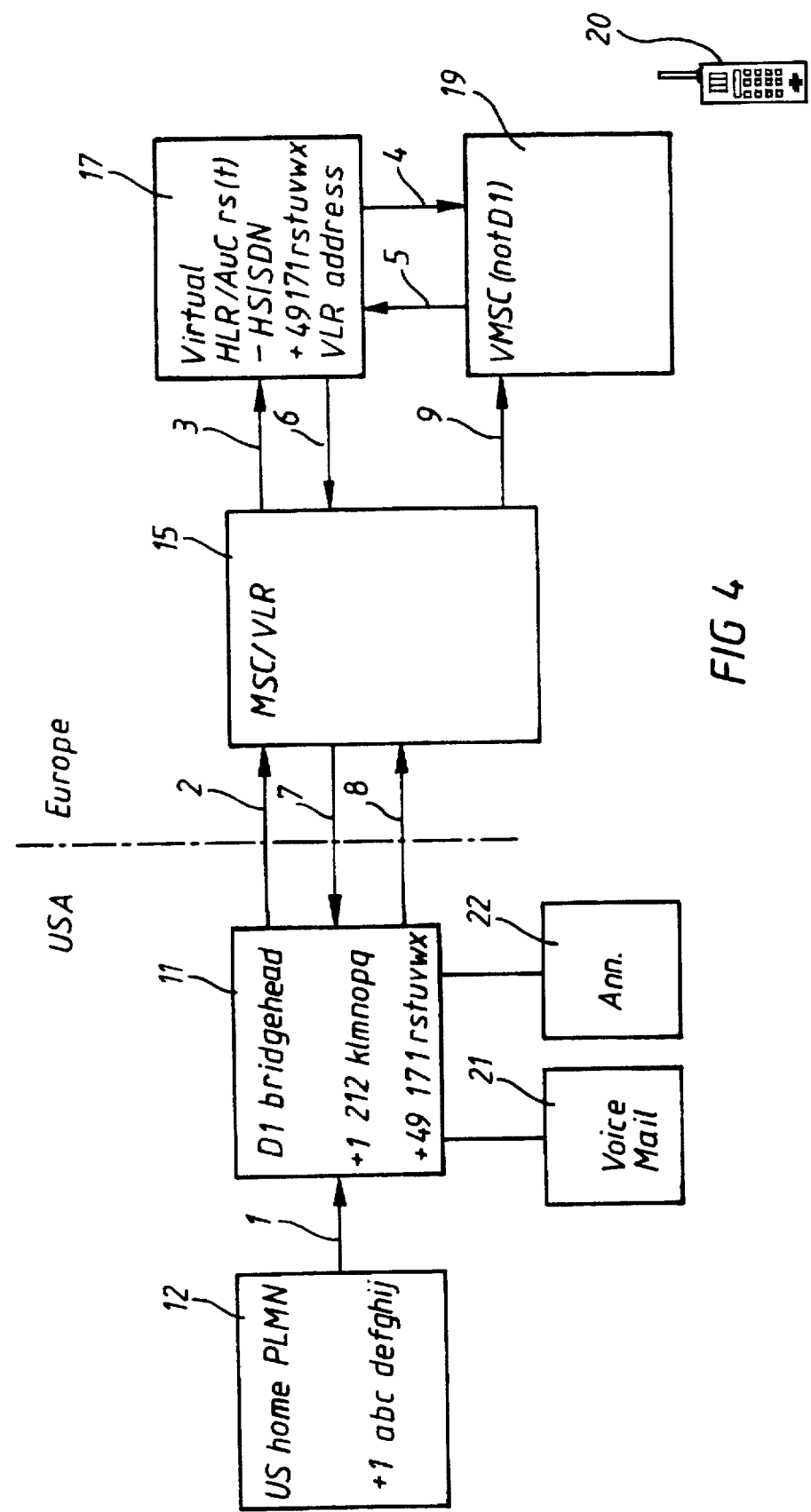
FIG. 4: shows a call transfer to a subscriber of another GSM communication network than the D1 network.

FIG. 4 shows a call forwarding in the case that the temporary GSM subscriber uses another mobile communication network than the D1 network. The call forwarding occurs in the same way as described in connection with FIG. 2. The Home Location Register 17 just contains the address of a Virtual Location Register of another GSM mobile communication network to which the call is routed as explained in connection with FIG. 2. The temporary GSM subscriber may be called out of a fixed network of the same or any other GSM mobile communication network. Also he may use the services as a calling subscriber, especially within the mobile communication network, to other mobile communication networks or to any fixed network.

Figure 5:
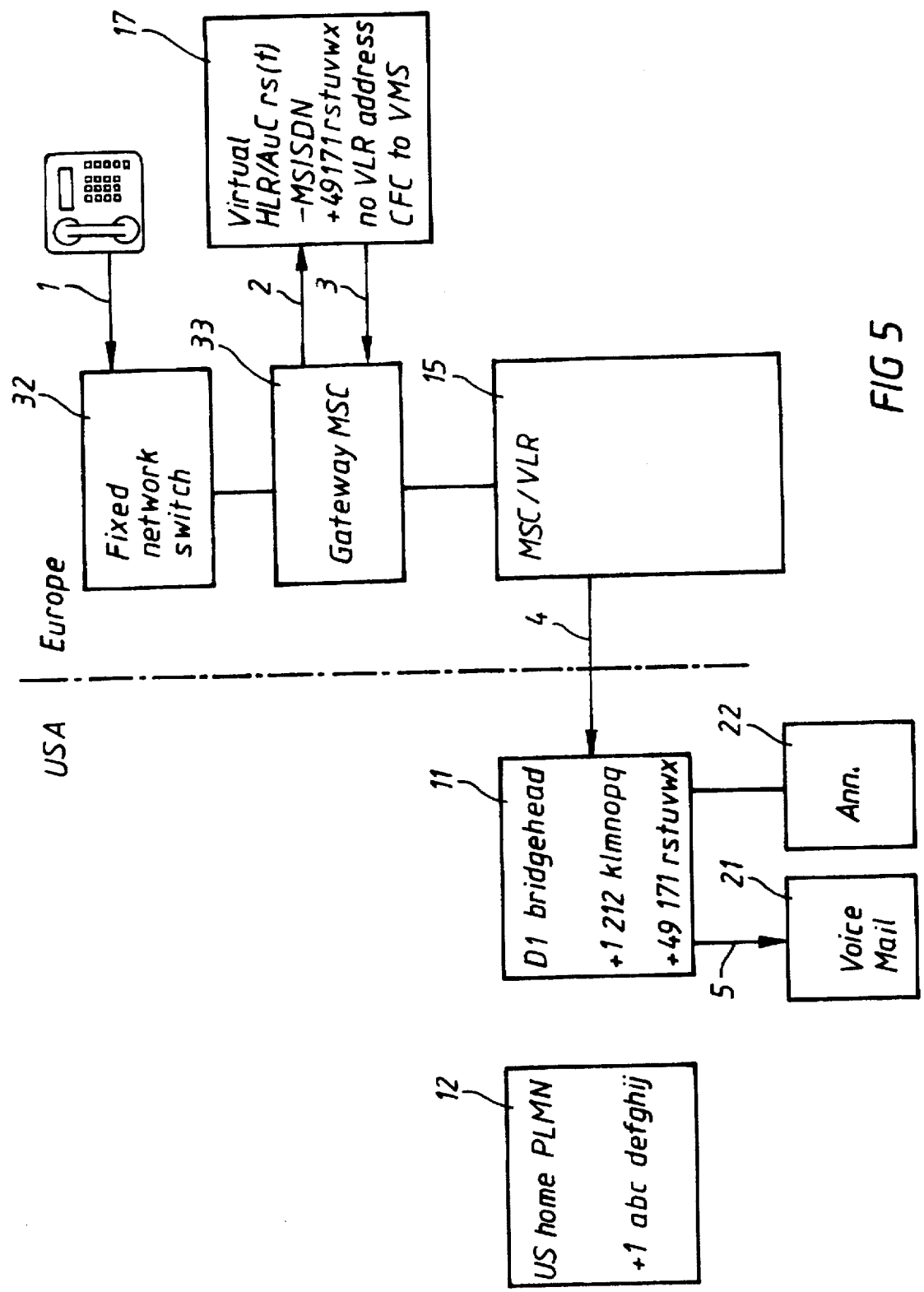
FIG. 5: shows the connection buildup from a fixed telephone network in Europe where the call is transferred to the Voice Mail System of the bridgehead because the temporary GSM subscriber is not on-line.

In case the temporary GSM subscriber is off-line or can not be reached a call forwarding to a Voice mail System 21 in the USA can be effected as described below. A subscriber 31 of a fixed network 32 dials the calling number of the temporary GSM subscriber (not shown in FIG. 5). The call is routed to the virtual Home Location Register 17 via a Gateway MSC 33 (arrows 1 and 2). There will be detected that there is no Visitor Location Register Address (VLR-Address), because the subscriber is obviously not within reach. The Virtual Home Location Register 17 contains the instruction for a conditional call forwarding to the Voice Mail System 21. The steps 3, 4 and 5 are now executed in the same way than the steps 4,5 and 6 described in connection with FIG. 3. The subscriber 31 may leave or play back a message using the Voice Mail System.

Figure 6:
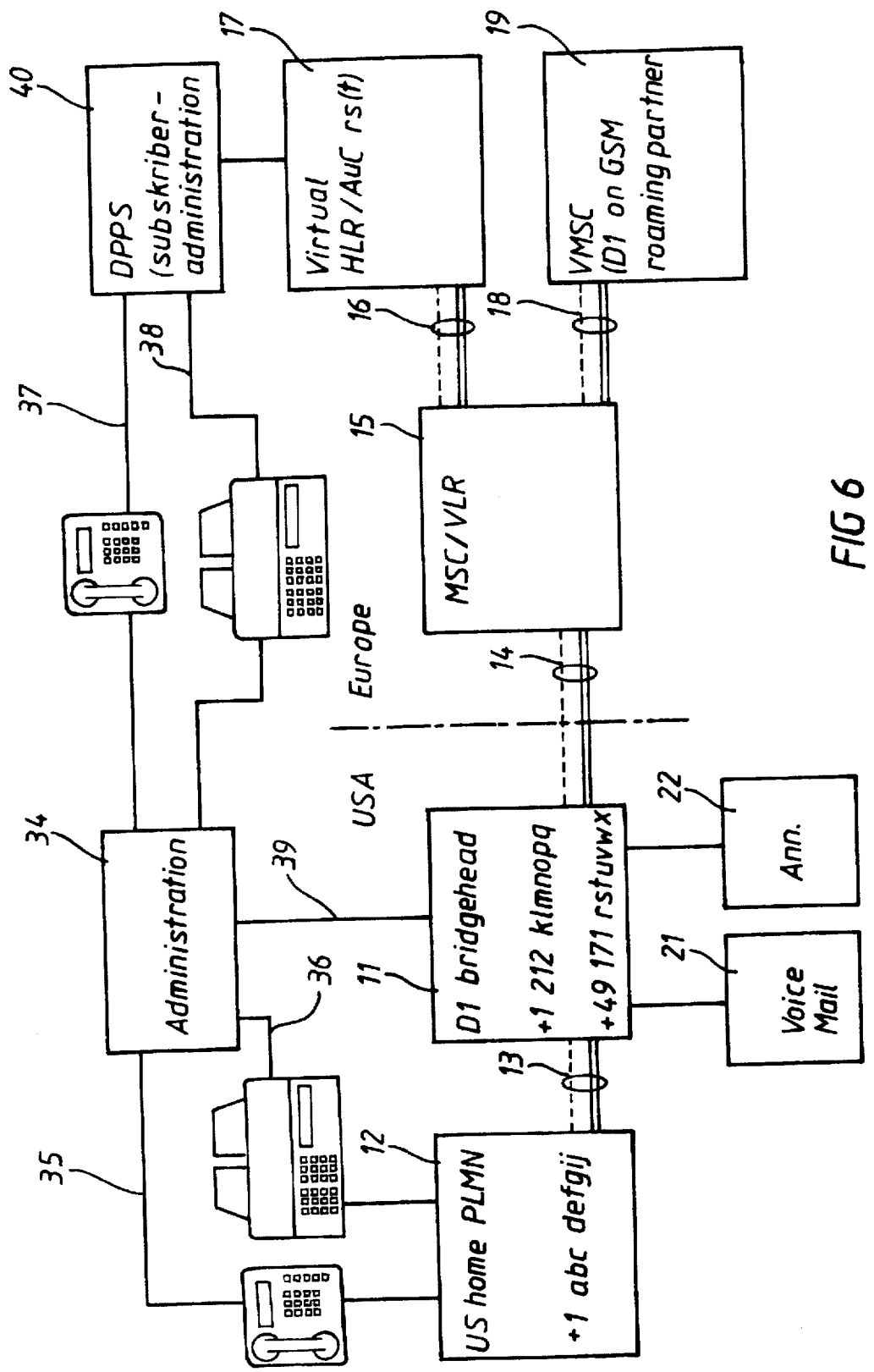
FIG. 6: the system according to the first main embodiment with corresponding administration.

FIG. 6 shows the system according to FIG. 1 with a administration unit 34, which is connected via telephone and facsimile lines 35-39 with the mobile communication network 12 in the USA, the bridgehead 11, and the subscriber administration 40 of the GSM mobile communication network. If there is a order for arranging a call forwarding the administration unit 34 informs and controls the concerned networks and network elements. There is established a call forwarding to the bridgehead 11 in the mobile communication network 12 and the subscriber administration 40 enables the calling number for the temporary GSM subscriber. The bridgehead 11 assigns this calling number to the calling number which is reached in the US mobile communication network 12 by call forwarding. The connections are canceled at termination of the temporary GSM subscriber contract.

Figure 7:
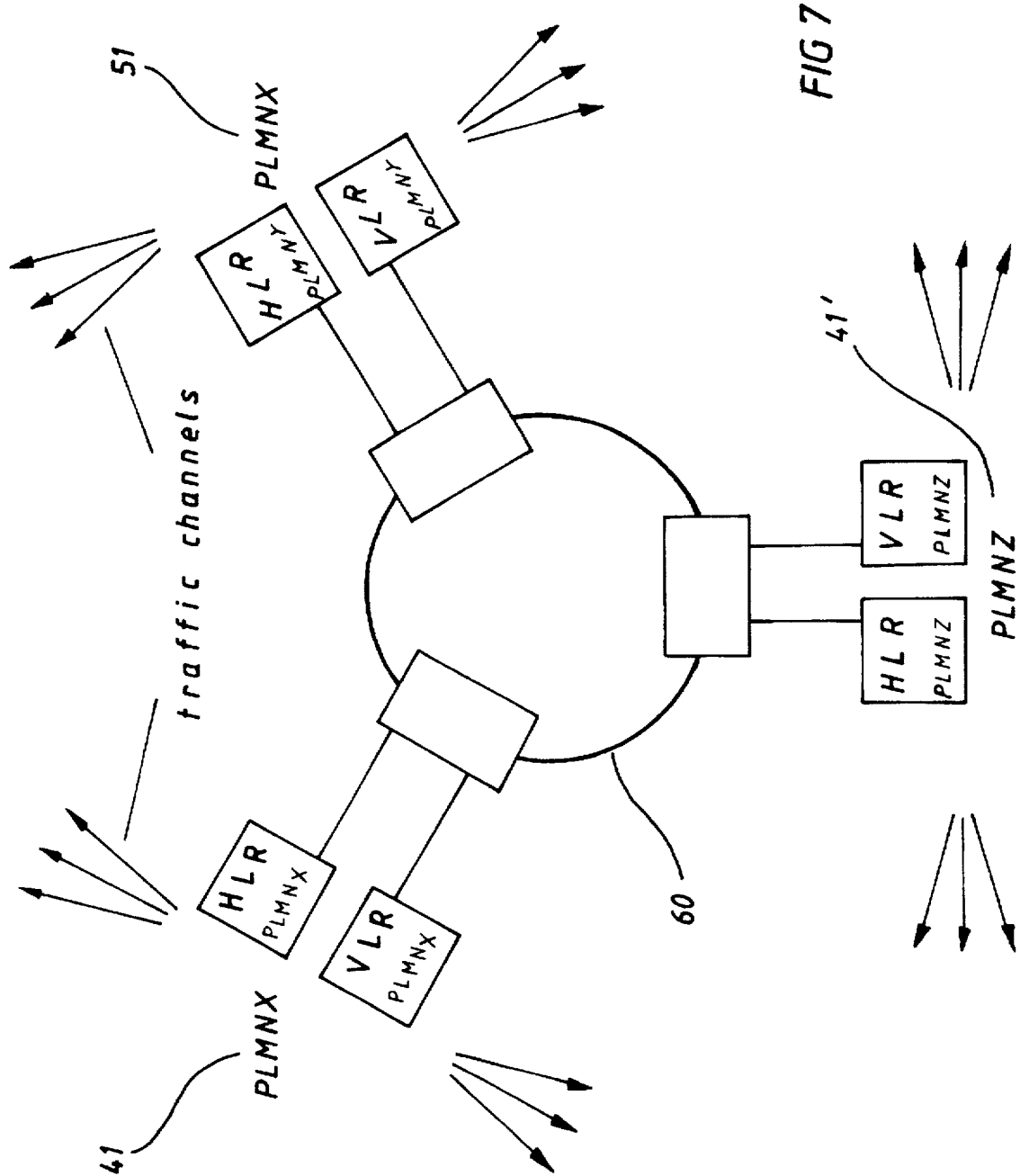
FIG. 7: a bridgehead between several mobile communication networks PLMN X, PLMN Y and PLMN Z, respectively, in accordance with the second main embodiment.

The second main embodiment according to claim 11 is described with reference to FIG. 7 and 8.

The mobile communication networks PLMN X and PLMN Z, referred to as 41, 41' respectively, are networks not in accordance with GSM standards, while mobile communication network PLMN Y, referred to as 51, is of GSM type. Between these networks there is provided a bridgehead 60.

FIG. 8 shows the interaction between two selected networks, wherein network PLMN X 1 is a network of AMPS type. Both networks PLMN X and PLMN Y are connected via signalling channels.

The HLR 42 of a subscriber 55 of network PLMN X is located in network PLMN X. The bridgehead has the following tasks: it retrieves the necessary data of the subscriber of network 11 from the HLR 42, in particular his Mobile Identification Number (MIN) and his Mobile Serial Number (MSN). Accordingly, in the network PLMN X the bridgehead acts as a VLR 61.

The AMPS subscriber information is then converted to GSM subscriber information, in particular MIN and MSN are converted to International Mobile Subscriber Identity (IMSI) and to Mobile Station International ISDN Number. This conversion is assisted by a local conversion data base.

The produced GSM subscriber information is now present in the bridgehead which is now acting as HLR 62 for network PLMN Y 51. If the subscriber 45 is located in the range of network PLMN Y he may be inserted in a VLR 53 as if he were a subscriber of network PLMN Y. His virtual subscriber information are called from the bridgehead acting as HLR 62.

The process is reversed for a subscriber 55 of network PLMN Y 51 located in the range of network PLMN X 41. His information is called from HLR 52 of network PLMN Y and transferred to the bridgehead (VLR 65). The GSM subscriber information is converted to AMPS subscriber information, assisted by a local conversion data base. Afterwards, the subscriber information is transferred to network PLMN X 41 (HLR 64). Subscriber 15 may be inserted in a VLR 43 of network PLMN X; his subscriber information may be called from the bridgehead (HLR 64).

Additionally, the bridgehead 60 may not only attend to signalling between the incompatible networks 41, 51, but also to traffic channels. Accordingly, there are provided connections between operating points GMSC 44 of network PLMN X and GMSC 54 of network PLMN Y via a protocol converter 76 of said bridgehead. Conversion 68 occurs between different transmitting systems, in particular a conversion from European ITU-T protocols (PCM 30) to US ANSI protocols (PCM24) and vice versa.

What is claimed is:

1. A system for virtual extension of a mobile communication network by at least a second, remote mobile communication network, wherein each of the mobile communication networks includes a Home Location Register (HLR) and a Visitor Location Register (VLR) and one of the communication networks is of the GSM type and can be accessed by a subscriber of either network, comprising:

a bridgehead between said first and second mobile communication networks, said bridgehead serving as an internetwork junction to one of said mobile communication networks of the GSM type (transition network), said bridgehead being connected to a Mobile Services Switching Center (MSC) of said transition network via signalling- and inteligence signal channels, said bridgehead acting as Visitor Location Register for another mobile communication network and as a Home Location Register for said transition network, if a subscriber of said other mobile communication network is in the range of said mobile communication networks of the GSM type, and said bridgehead acting as a Home Location Register for said other mobile communication network and as a Visitor Location Register for said transition network, if a subscriber of said mobile communication networks of the GSM type is in the range of said other mobile communication network.

2. The system according to claim 1, wherein the bridgehead is capable of conducting a Mobile Management Protocol, especially the Mobile Application Part according to the GSM standard.

3. The system according to claim 1, wherein Voice signals from said transition network and said another mobile communication network are storable in the Voice Mail System.

4. The system according to claim 1, wherein said voice signals stored in said voice Mail system can be recalled through said transition network and said at least another mobile communication network.

5. The system according to claim 1, wherein the bridgehead comprises a speech memory for storing announcements.

6. The system according to claim 5, wherein the stored announcements are recallable during calls from the said transition network depending on signals from said at least another mobile communication network and vice versa.

7. The system according to claim 1, wherein the bridgehead is provided with means for storing and restoring voice signals (Voice Mail System).

8. The system according to claim 2, wherein the bridgehead is provided with means for storing and restoring voice signals (Voice Mail System).

9. The system according to claim 8, wherein Voice signals from said transition network and said another mobile communication network are storable in the Voice Mail System.

10. The system according to claim 8, wherein said voice signals stored in said Voice Mail System can be recalled through said transition network and said at least another mobile communication network.

* * * * *